May 26, 1936.   H. A. PALMER   2,042,358
DRIVING MECHANISM OF THE ONE-WAY CLUTCH TYPE
Filed June 18, 1934   3 Sheets-Sheet 1

Inventor
Harry A. Palmer
By Geo. P. Kimmel
Attorney

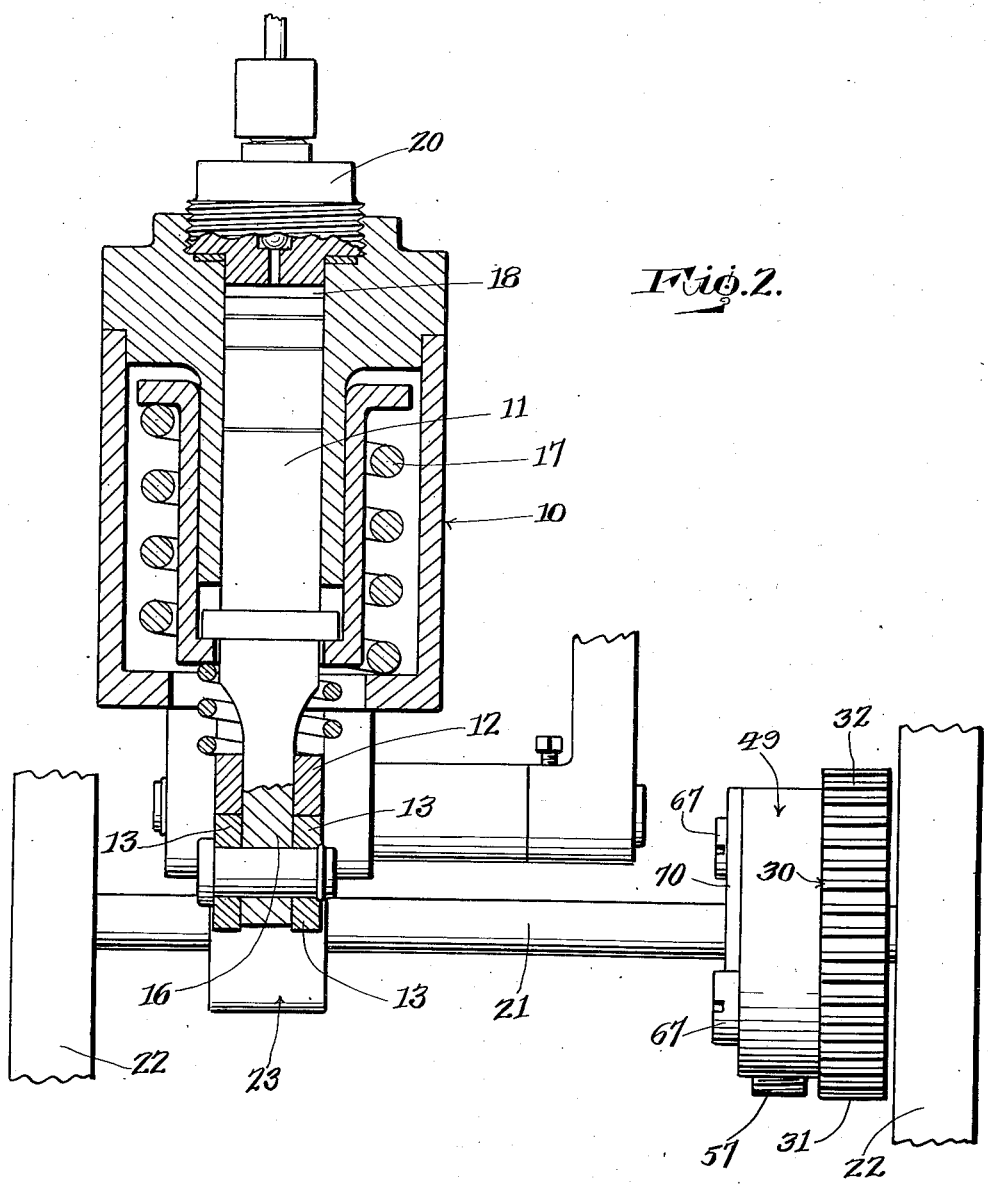

May 26, 1936.  H. A. PALMER  2,042,358
DRIVING MECHANISM OF THE ONE-WAY CLUTCH TYPE
Filed June 18, 1934   3 Sheets-Sheet 3
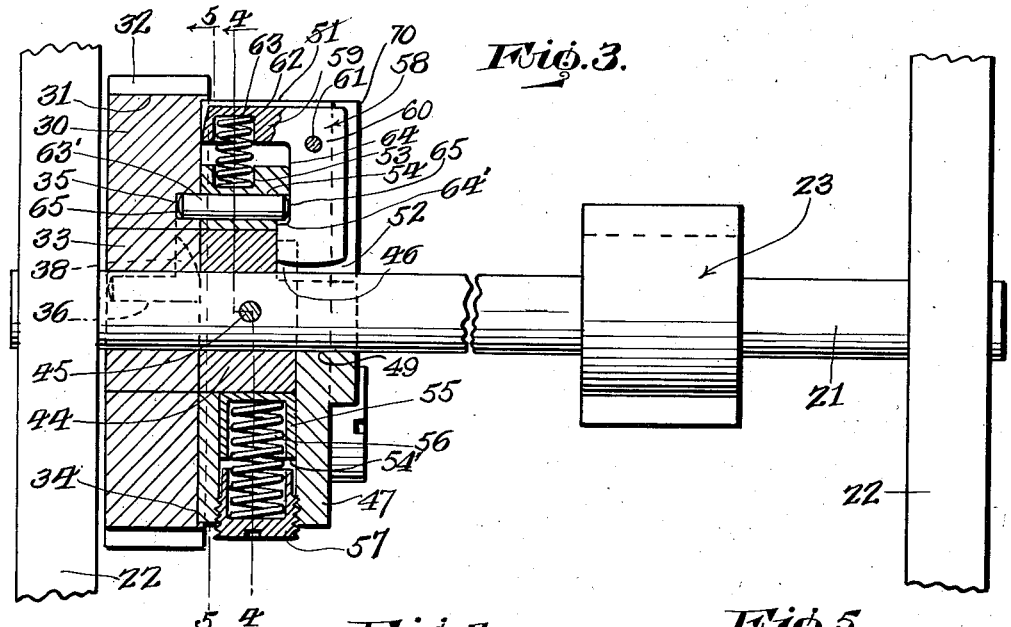
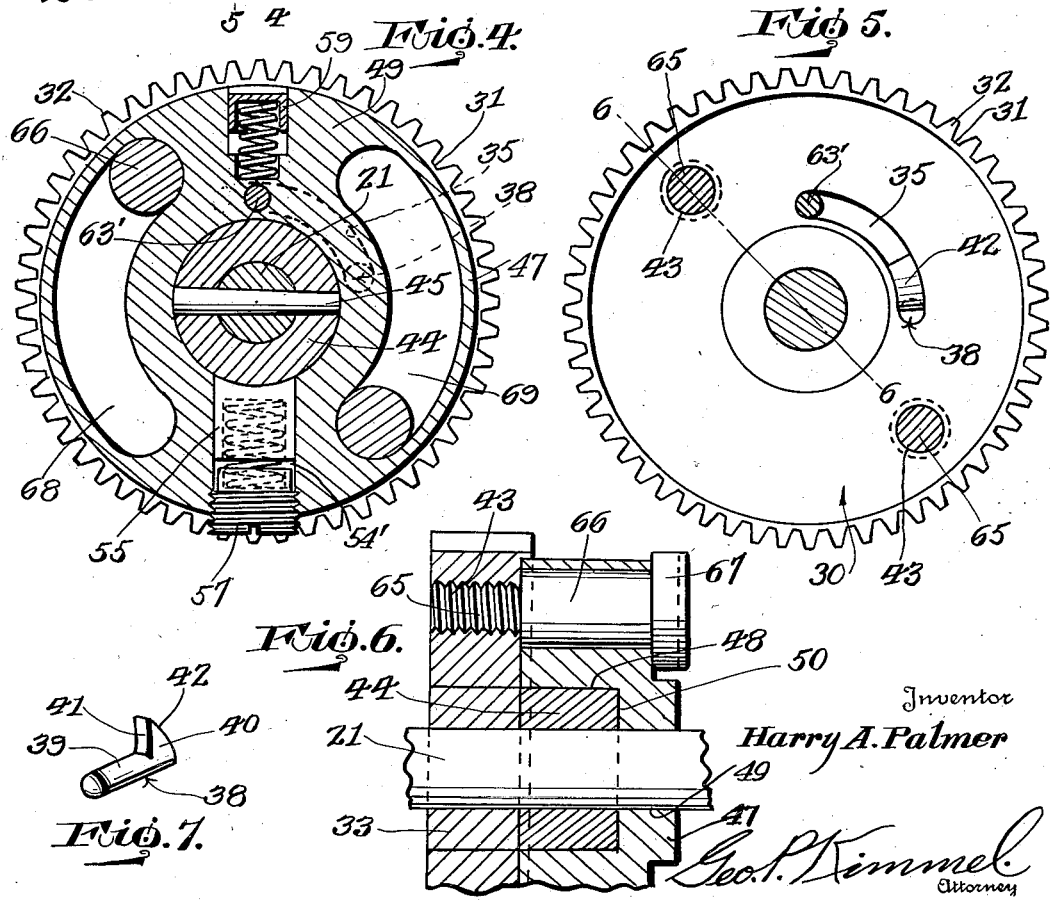
Inventor
Harry A. Palmer
Geo. P. Kimmel
Attorney Patented May 26, 1936

2,042,358

UNITED STATES PATENT OFFICE 2,042,358

DRIVING MECHANISM OF THE ONE-WAY CLUTCH TYPE

Harry A. Palmer, Malden, Mass., assignor to Palmer Inventions Inc., Malden, Mass., a corporation of Massachusetts Application June 18, 1934, Serial No. 731,207

11 Claims. (Cl. 192—46)

This invention relates to a driving mechanism of the one-way clutch type designed primarily for use in connection with driven cam controlling structures for the pulling elements of spring controlled pistons of pumping mechanisms used for supplying fuel to combustion chambers of internal combustion engines, but it is to be understood that a driving mechanism, in accordance with this invention may be employed in any connection for which it is found applicable, and the invention has for its object to provide in a manner as hereinafter set forth, means for discontinuing the drive of the cam controlling structure, when the engine with which the pump mechanism is associated back fires and reverses to prevent the impairment of said structure, element and mechanism.

A further object of the invention is to provide, in a manner as hereinafter set forth, a rotatable driving member capable of being operated from the engine, with which the pumping mechanism is associated in a clockwise and counter-clockwise direction and including means for releasably coupling therewith the cam controlling structure to provide for driving the latter solely during the clockwise direction of movement of the driving member.

Further objects of the invention are to provide, in a manner as hereinafter set forth, a driving mechanism for the purpose referred to which is simple in its construction and arrangement, strong, durable, readily installed with respect to the cam controlling structure, automatic in its releasing action from driving engagement with respect to said structure, thoroughly efficient in its use, and comparatively inexpensive to manufacture.

To the above ends essentially, and to others which may hereinafter appear, the invention consists of such parts, and such combination of parts which fall within the scope of the invention as claimed.

In the drawings:

Figure 2 is a view similar to and at right angles to Figure 1,

Figure 1:
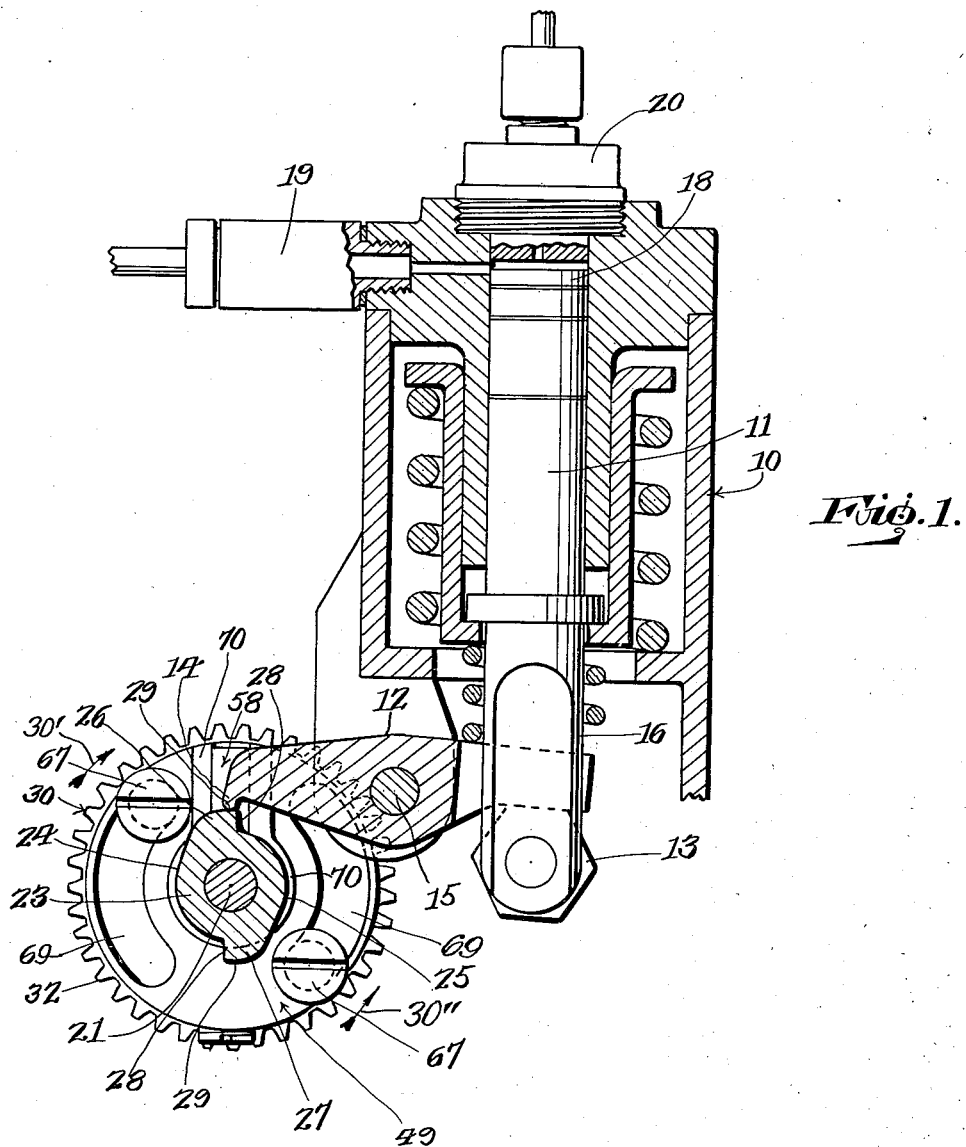
Figure 1 is a vertical sectional view of a pumping mechanism of that type including a spring controlled reciprocatory piston, a pulling element for the latter and a cam controlling structure for said element, and further showing the adaptation with the cam controlling structure of the driving mechanism in accordance with this invention.

Figure 3 is a side elevation of the cam controlling structure having installed therewith the driving mechanism and with the latter illustrated in vertical section, Figure 4 is a section on line 4—4, Figure 3, Figure 5 is a section on line 5—5, Figure 3, Figure 6 is a section on line 6—6, Figure 5, and Figure 7 is a perspective view of the cam member of the driving mechanism.

The pumping mechanism shown with the exception of the form of cam controlling structure is similar to that as disclosed in Letters Patent 1,904,799 granted April 18, 1933, and is generally indicated at 10. The said mechanism 10 includes a reciprocatory spring controlled piston 11, a bifurcated pawl or pulling element 12 for piston 11, a pair of abutments 13 for the bifurcated portion of the pawl 12, a nose 14 on the outer end of pawl 12 and an adjustable shaft 15 for pawl 12. The bifurcated portion of the latter straddles the reduced inner end 16 of piston 11 and seats against the abutments 13. The parts aforesaid function to pull the piston rearwardly to provide the suction stroke for the latter and to compress the expelling spring 17 for the piston 11. When pawl 12 is released by the cam controlling structure, to be referred to, spring 17 is also released and acts upon piston 11 to provide an expelling stroke therefor. On the suction stroke of the piston fuel is drawn into the piston chamber 18, and on the expelling stroke of the piston fuel is discharged from chamber 18. The intake and outlet valve structures for chamber 18 are designated 19, 20 respectively. The abutments 13 are carried by the reduced end 16 of piston 11.

The cam controlling structure includes a shaft 21 journaled in supports 22 and a cam 23 which is fixedly secured to or is integral with shaft 21 intermediate the ends of the latter. The cam 23 is formed with a pair of oppositely disposed working surfaces 24, 25 which gradually rise and terminate in a pair of oppositely disposed lobes 26, 27 having substantially straight edge portions 28 and curved edge portions 29 forming continuations of the working surfaces 24, 25 and merging into the outer ends of the edge portions 28.

The construction of the driving mechanism is more clearly shown in Figures 3 to 7 and it includes an annulus 30 which is capable of being driven in a clockwise and in an anti-clockwise direction. The clockwise direction of movement of annulus 30 is indicated by the arrow 30' Figure 1. The anti-clockwise direction of movement of annulus 30 is indicated by the arrow 30" Figure 1. The annulus 30 is formed throughout the outer edge 31 with transversely extending teeth 32. Releasably connected with the inner edge of annulus 30 is a collar 33 which is revolubly mounted on shaft 21. The inner side face of annulus 30 is cut away to form a circular recess 34 having its wall in proximity to the base of teeth 32. The collar 33 is flush at one end with the outer side face of annulus 30, and at its other end is flush with the base of recess 34. The base of recess 34 is formed with an arcuate groove 35. The annulus 30 is provided with a pocket 36 which opens into that end of groove 35 which would constitute the leading end of groove 35 when annulus 30 is driven in a clockwise direction as indicated by the arrow 30'. That end of groove 35 in which socket 36 does not open will constitute the leading end of groove 35 when annulus 30 is driven in an anti-clockwise direction as indicated by the arrow 30". The pocket 36 is disposed at right angles to groove 35 and parallel to the axis of shaft 31. Positioned in pocket 36 and extending into and arranged at one end of groove 35, as well as being flush with the base of recess 34 is a cam member 38 constituting a shifter for a purpose to be referred to. The member 38 is formed of a stem 39 having the outer end portion of one side thereof integral with the base of a laterally disposed substantially triangular shaped head 40 formed with an inner straight and an outer curved edge 41, 42, respectively. The edge 41 is seated upon the base of groove 35 and edge 42 leads outwardly from said base. The outer end of member 38 is flush with the base of recess 34. The annulus 30 in connection with collar 33 provides a gear which is driven from the engine by any suitable power transmission arrangement. The annulus 30 is formed with a pair of diametrically opposed openings 43 having threaded walls for a purpose to be referred to.

The driving mechanism includes a clutching structure which couples the annulus 30, when the latter is travelling clockwise to shaft 21 for the purpose of driving shaft 21 simultaneously with the clockwise movement of the annulus 30. The said structure further functions to release the annulus 30 from driven engagement with the cam shaft 21 when the annulus 30 is travelling in an anti-clockwise direction thereby discontinuing the operation of shaft 21. The arrangement is for the purpose of discontinuing the drive of shaft 21 when the engine back fires. Normally the annulus 30 is being driven from the engine in a clockwise direction, but when the engine back fires the travel of annulus 30 changes from a clockwise to an anti-clockwise direction.

The cam shaft driving structure includes a collar 44 which has its outer end opposed to the inner end of collar 33 and is fixed upon shaft 21 by a pin 45 extending diametrically therethrough and also through said shaft. The collar 44 at its inner end is formed with a radially disposed groove 46 which opens at its periphery and at its inner end edge. Encompassing and opposing the inner end of the collar 44 is an annular member 47 formed with an axial opening having its walls of two different diameters. That portion of said wall of larger diameter, indicated at 48 surrounds collar 44 and the other portion of said wall, indicated at 49 forms a continuation of the inner edge of collar 44 and surrounds shaft 21. The junction of said two wall portions provides a shoulder 50 which opposes the inner end of collar 44. The member 47 is also provided with an angle-shaped opening formed of a horizontally disposed branch 51 and a radial branch 52, extending from the outer end of branch 51 to the outer side face of member 47 and opens at the periphery of the latter. The member 47 has a pocket 53 which opens into branch 51 and it is also formed inwardly of the base of pocket 53 with an opening 54 disposed parallel to the axis of collar 44 and extending from the branch 52 to the outer side face of said member 47. The member 47 has a radially disposed opening 54' in which is arranged a spring controlled binding shoe 55 for frictionally coupling collar 44 and member 47 together. Arranged in opening 54' is the controlling spring 56 for shoe 55. The spring 56 has its tension controlled by a plug 57 which threadedly engages with the wall of opening 54'. The shoe 55 and the inner end of plug 57 are hollow for receiving and overlapping spring 56. Seated in the angle-shaped opening is a releasable angle-shaped coupler 58 for connecting member 47 to collar 44 for the purpose of driving shaft 21 when annulus 30 is driven in a clockwise direction. The coupler 58 consists of a horizontal leg 59 and a radially disposed leg 60 arranged in the branches 51, 52 respectively. At the point of joinder of leg 59 with leg 60, the coupler 58 is pivotally mounted, as at 61. The leg 59 has a pocket 62 having its mouth opposing the mouth of pocket 53. The coupler 58 is spring controlled for the purpose of maintaining leg 60 in branch 52 and groove 46 of collar 44 to connect the latter and member 47 together for causing the operation of shaft 21 when annulus 30 is moving in a clockwise direction. The controlling spring for coupler 58 is designated 63 and it is positioned in the pockets 53, 62.

The coupler 58 is swung from coupling position with respect to collar 44 and member 47, when annulus 30 moves in an anti-clockwise direction by releasing pin 63' which is slidably mounted in and of greater length than opening 54. The pin 63' opposes the edge 64 of the leg 60 of coupler 58. The edge 64 is shouldered as at 64'. The shoulder 64' is positioned inwardly with respect to pin 63'. The ends 65 of pin 63' are rounded. The pin 63' normally extends into the slot 35, due to the action of spring 63 on coupler 58, and when annulus 30 is moving in a clockwise direction pin 63 is positioned at the follower end wall of slot 35.

Anchored in the openings 43 are the reduced threaded ends 65 of a pair of headed retaining members 66 for holding the annulus 30 and member 47 in opposed relation. The heads of members 66 are designated 67. The members 66 extend through a pair of oppositely disposed spaced arcuate slots 68, 69 which are arranged between each side of the angle-shaped opening and each side of the friction shoe 55, as well as being spaced from said angle-shaped opening and said shoe. The heads 67 bear against the inner side face of member 47 to hold the latter against annulus 30, but not to an extent to prevent movement of the annulus 30 relative to member 47 when annulus 30 moves in an anti-clockwise direction. The length of the slots 68, 69 is such as to permit of the annulus moving in an anti-clockwise direction relative to the member 47 to the desired extent when occasion requires. The members 66 in connection with the pin 63' coact with the annulus 30 and member 47 to provide for the driving of the latter when annulus 30 moves in a clockwise direction, and in this connection, when the annulus moves in a clockwise direction, one retaining member 66 abuts the leading end wall of slot 68 and the other abuts the leading end wall of slot 69. When annulus 30 moves in an anti-clockwise direction its retaining members 66 are moved away from said end walls of the slots by the annulus.

The cam member 38 acts as a means for shifting pin 63' in a direction to swing leg 60 outwardly to clear opening 46 in collar 44 for the purpose of discontinuing the operation of the cam shaft 21 when the engine back fires or reverses.

The member 47 is provided with a lateral extension 70 for the radially disposed branch 52 of the L-shaped opening forming a guide for the leg 60. The extension 70 constitutes flush continuations of the walls of branch 52. The extension also forms a flush continuation of the wall portion 49 of the axial opening of member 47. The leg 60 when in normal position is arranged inwardly of said extension 70.

The normal position of the driving mechanism is as shown in Figures 3 and 4 with the pin 63' arranged in the follower portion of slot 35, and members 66 positioned at the leading end walls of slots 68, 69 and the leg 60 of coupler 58 extended into groove 46. When the parts are in the position as just referred to the annulus 30 will be moving in a clockwise direction, driving shaft 21 to cause cam 23 acting on pawl 12 to cause the latter to intermittently provide suction strokes for the piston 11. Now it will be assumed that the engine back fires causing the annulus 30 to move in an anti-clockwise direction, and when moving in such direction, the pin 63' will ride up the face 42 of member 38 and be moved in a direction to shift leg 60 of coupler 58 clear of opening 46 whereby the drive of shaft 21 is discontinued. Immediately upon the annulus reversing its movement from anti-clockwise to clockwise the parts will be caused to assume their normal position for the purpose of driving shaft 21. The spring controlled shoe 55 prevents the slipping of member 47 relative to collar 44 so opening 46 will always be in position to receive the leg 60 of coupler 58.

What I claim is:

1. A driving mechanism for controlling the operation of a cam shaft comprising a gear operable in a clockwise and anti-clockwise direction and loosely mounted on said shaft, a driving structure formed of an inner and outer part, said inner part adapted to be fixed to said shaft for driving it and encompassed by the said outer part, said outer part being provided with pivoted means releasably extending into said inner part for causing said parts to operate in unison, said outer part being provided with slidable means releasably extending into said gear permitting the pivoted means to engage the inner part when said gear moves in a clockwise direction thereby providing for the operation of said structure to drive said shaft, spaced connecting members between said gear and outer part for maintaining the latter in sidewise opposed relation with respect to the gear, said outer part being formed with clearances for said members when the gear moves in an anti-clockwise direction, and said gear being provided with means acting, when said gear moves in an anti-clockwise direction upon said slidable means for shifting it in a direction to permit of the gear moving independently of said driving structure and to release said pivoted means from said inner part.

2. A driving mechanism for controlling the operation of a cam shaft comprising a gear operable in clockwise and anti-clockwise direction and loosely mounted on said shaft, a driving structure formed of an inner and outer part, said inner part adapted to be fixed to said shaft for driving it and encompassed by the said outer part, said outer part being provided with pivoted means releasably extending into said inner part for causing said parts to operate in unison, said outer part being provided with slidable means releasably extending into said gear permitting the pivoted means to engage the inner part when said gear moves in a clockwise direction thereby providing for the operation of said structure to drive said shaft, spaced connecting members between said gear and outer part for maintaining the latter in sidewise opposed relation with respect to the gear, said outer part being formed with clearances for said members when the gear moves in an anti-clockwise direction, said gear being provided with means acting, when said gear moves in an anti-clockwise direction upon said slidable means for shifting it in a direction to permit of the gear moving independently of said driving structure and to release said pivoted means from said inner part, and said outer part being provided with adjustable controlled means for frictionally securing it to said inner part, and said pivoted means having as a part thereof a controlling spring housed therein and in said outer part.

3. A driving mechanism for controlling the operation of a cam shaft comprising a gear operable in clockwise and anti-clockwise direction and loosely mounted on said shaft, a driving structure formed of an inner and outer part, said inner part adapted to be fixed to said shaft for driving it and encompassed by the said outer part, said outer part being provided with pivoted means releasably extending into said inner part for causing said parts to operate in unison, said outer part being provided with slidable means releasably extending into said gear permitting the pivoted means to engage the inner part when said gear moves in a clockwise direction thereby providing for the operation of said structure to drive said shaft, spaced connecting members between said gear and outer part for maintaining the latter in sidewise opposed relation with respect to the gear, said outer part being formed with clearances for said members when the gear moves in anti-clockwise direction, said gear being provided with means acting, when said gear moves in an anti-clockwise direction upon said slidable means for shifting it in a direction to permit of the gear moving independently of said driving structure and to release said pivoted means from said inner part, the said inner part being formed with a groove for the reception of said pivoted means, said groove opening at the outer periphery and at one end of said inner part.

4. A driving mechanism for controlling the operation of a cam shaft comprising a gear operable in clockwise and anti-clockwise direction and loosely mounted on said shaft, a driving structure formed of an inner and an outer part, said inner part adapted to be fixed to said shaft for driving it and encompassed by the said outer part, said outer part being provided with pivoted means releasably extending into said inner part for causing said parts to operate in unison, said outer part being provided with slidable means releasably extending into said gear permitting the pivoted means to engage the inner part when said gear moves in a clockwise direction, thereby providing for the operation of said structure to drive said shaft, spaced connecting members between said gear and outer part for maintaining the latter in sidewise opposed relation with respect to the gear, said outer part being formed with clearances for said members when the gear moves in an anti-clockwise direction, and said gear being provided with means acting, when said gear moves in an anti-clockwise direction upon said slidable means for shifting it in a direction to permit of the gear moving independently of said driving structure and to release said pivoted means from said inner part, said outer part being provided with an opening formed of two branches extending at right angles to each other, said pivoted means formed of a pair of legs disposed at an angle to each other and arranged within said branches, the pivot for said pivoted means being arranged at the point of joinder of the legs thereof, and said slidable means opposing one edge of one of said legs.

5. A driving mechanism for controlling the operation of a cam shaft comprising a gear operable in clockwise and anti-clockwise direction and loosely mounted on said shaft, a driving structure formed of an inner and outer part, said inner part adapted to be fixed to said shaft for driving it and encompassed by the said outer part, said outer part being provided with pivoted means releasably extending into said inner part for causing said parts to operate in unison, said outer part being provided with slidable means releasably extending into said gear permitting the pivoted means to engage the inner part when said gear moves in a clockwise direction thereby providing for the operation of said structure to drive said shaft, spaced connecting members between said gear and outer part for maintaining the latter in sidewise opposed relation with respect to the gear, said outer part being formed with clearances for said members when the gear moves in an anti-clockwise direction, said gear being provided with means acting, when said gear moves in an anti-clockwise direction upon said slidable means for shifting it in a direction to permit of the gear moving independently of said driving structure and to release said pivoted means from said inner part, and said outer part being provided with adjustable controlled means for frictionally securing it to said inner part, and said pivoted means having as a part thereof a controlling spring housed therein and in said outer part, said outer part being provided with an opening formed of two branches extending at right angles to each other, said pivoted means formed of a pair of legs disposed at an angle to each other and arranged within said branches and the pivot for said pivoted means being arranged at the point of joinder of the legs thereof, and said slidable means opposing one edge of one of said legs.

6. A driving mechanism for controlling the operation of a cam shaft comprising a gear operable in clockwise and anti-clockwise direction and loosely mounted on said shaft, a driving structure formed of an inner and outer part, said inner part adapted to be fixed to said shaft for driving it and encompassed by the said outer part, said outer part being provided with pivoted means releasably extending into said inner part for causing said parts to operate in unison, said outer part being provided with slidable means releasably extending into said gear permitting the pivoted means to engage the inner part when said gear moves in a clockwise direction thereby providing for the operation of said structure to drive said shaft, spaced connecting members between said gear and outer part for maintaining the latter in sidewise opposed relation with respect to the gear, said outer part being formed with clearance for said members when the gear moves in an anti-closkwise direction, said gear being provided with means acting, when said gear moves in an anti-clockwise direction, upon said slidable means for shifting it in a direction to permit of the gear moving independently of said driving structure and to release said pivoted means from said inner part, and said outer part being provided with adjustably controlled means for frictionally securing it to said inner part, and said pivoted means having as a part thereof a controlling spring housed therein and in said outer part, the said inner part being formed with a groove for the reception of said pivoted means, said groove opening at the outer periphery and at one end of said inner part.

7. A driving mechanism for controlling the operation of a cam shaft comprising a gear operable in clockwise and anti-clockwise direction and loosely mounted on said shaft, a driving structure formed of an inner and an outer part, said inner part adapted to be fixed to said shaft for driving it and encompassed by the said outer part, said outer part being provided with pivoted means reelasably extending into said inner part for causing said parts to operate in unison, said outer part being provided with slidable means releasably extending into said gear permitting the pivoted means to engage the inner part when said gear moves in a clockwise direction, thereby providing for the operation of said structure to drive said shaft, spaced connecting members between said gear and outer part for maintaining the latter in side wise opposed relation with respect to the gear, said outer part being formed with clearances for said members when the gear moves in an anti-clockwise direction, and said gear being provided with means acting, when said gear moves in an anti-clockwise direction upon said slidable means for shifting it in a direction to permit of the gear moving independently of said driving structure and to release said pivoted means from said inner part, said outer part being provided with an opening formed of two branches extending at right angles to each other, said pivoted means formed of a pair of legs disposed at an angle to each other and arranged within said branches, the pivot for said pivoted means being arranged at the point of joinder of the legs thereof, said slidable means opposing one edge of one of said legs, and said outer part being provided with adjustable controlled means for frictionally securing it to said inner part, and said pivoted means having as a part thereof a controlling spring housed therein and in said outer part.

8. A driving mechanism for controlling the operation of a cam shaft comprising a gear operable in clockwise and anti-clockwise direction and loosely mounted on said shaft, a driving structure formed of an inner and outer part, said inner part adapted to be fixed to said shaft for driving it and encompassed by the said outer part, said outer part being provided with pivoted means releasably extending into said inner part for causing said parts to operate in unison, said outer part being provided with slidable means releasably extending into said gear permitting the pivoted means to engage the inner part when said gear moves in a clockwise direction thereby providing for the operation of said structure to drive said shaft, spaced connecting members between said gear and outer part for maintaining the latter in sidewise opposed relation with respect to the gear, said outer part being formed with clearances for said members when the gear moves in an anti-clockwise direction, said gear being provided with means acting when said gear moves in an anti-clockwise direction upon said slidable means for shifting it in a direction to permit of the gear moving independently of said driving structure and to release said pivoted means from said inner part, said outer part being provided with adjustable controlled means for frictionally securing it to said inner part, and said pivoted means having as a part thereof a controlling spring housed therein and in said outer part, said outer part being provided with an opening formed of two branches extending at right angles to each other, said pivoted means formed of a pair of legs disposed at an angle to each other and arranged within said branches, the pivot for said pivoted means being arranged at the point of joinder of the legs thereof, and said slidable means opposing one edge of one of said legs.

9. A driving mechanism for controlling the operation of a cam shaft comprising a gear operable in clockwise and anti-clockwise direction and loosely mounted on said shaft, a driving structure formed of an inner and outer part, said inner part adapted to be fixed to said shaft for driving it and encompassed by the said outer part, said outer part being provided with pivoted means releasably extending into said inner part for causing said parts to operate in unison, said outer part being provided with slidable means releasably extending into said gear permitting the pivoted means to engage the inner part when said gear moves in a clockwise direction thereby providing for the operation of said structure to drive said shaft, spaced connecting members between said gear and outer part for maintaining the latter in sidewise opposed relation with respect to the gear, said outer part being formed with clearances for said members when the gear moves in anti-clockwise direction, said gear being provided with means acting when said gear moves in an anti-clockwise direction upon said slidable means for shifting it in a direction to permit of the gear moving independently of said driving structure and to release said pivoted means from said inner part, the said inner part being formed with a groove for the reception of said pivoted means, said groove opening at the outer periphery and at one end of said inner part.

10. A driving mechanism for controlling the operation of a cam shaft, comprising a driving gear loosely mounted on said shaft and operable in a clockwise and an anti-clockwise direction, a driving structure including an inner section permanently fixed to said shaft and an outer section revolubly mounted about said inner section, said outer section being provided with a slidably mounted part disposed parallel to the axis of the shaft for controlling said outer section, said sections having coacting interengaging means for coupling them together to provide for the operation of the shaft when the gear moves clockwise, said gear having means acting upon one end of said part for shifting it in a direction, when said gear moves anti-clockwise for separating said interengaging coacting means to discontinue the operation of said shaft, and the said coacting means of said outer section engageable with the other end of said part for shifting it in a direction to couple said outer section to said gear.

11. A driving mechanism for controlling the operation of a cam shaft comprising a driving gear loosely mounted on said shaft and operable in a clockwise and an anti-clockwise direction, a driving structure including an inner section permanently fixed to said shaft and an outer section revolubly mounted about said inner section, said outer section being provided with a slidably mounted part disposed parallel to the axis of the shaft for controlling said outer section, said sections having coacting interengaging means for coupling them together to provide for the operation of the shaft when the gear moves clockwise, said gear having means active upon one end of said part for shifting it in a direction, when said gear moves anti-clockwise for separating said interengaging coacting means to discontinue the operation of said shaft, and the said coacting means of said outer section engageable with the other end of said part for shifting it in a direction to couple said outer section to said gear, and a spring controlled frictional shoe carried by said outer section and permanently engaging said inner section.

HARRY A. PALMER.